(12) United States Patent
Chen et al.

(10) Patent No.: US 11,665,328 B2
(45) Date of Patent: May 30, 2023

(54) METHOD AND ELECTRONIC APPARATUS FOR STITCHING THREE-DIMENSIONAL SPHERICAL PANORAMA

(71) Applicant: Coretronic Corporation, Hsin-Chu (TW)

(72) Inventors: Yen-Yi Chen, Hsin-Chu (TW); Huai-En Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 74 days.

(21) Appl. No.: 17/493,846

(22) Filed: Oct. 5, 2021

(65) Prior Publication Data

US 2022/0124298 A1  Apr. 21, 2022

(30) Foreign Application Priority Data

Oct. 21, 2020 (CN) .......................... 202011129639.1

(51) Int. Cl.
*H04N 13/156* (2018.01)
*G06T 7/11* (2017.01)
(Continued)

(52) U.S. Cl.
CPC ........... *H04N 13/156* (2018.05); *G06T 5/002* (2013.01); *G06T 7/11* (2017.01); *H04N 9/64* (2013.01);
(Continued)

(58) Field of Classification Search
CPC ..... G06T 3/0062; G06T 3/4038; G06T 5/006; G06T 3/005; G06T 2200/32; G06T 15/00; G06T 7/20; G06T 7/579
See application file for complete search history.

(56) References Cited

U.S. PATENT DOCUMENTS

2016/0352982 A1\* 12/2016 Weaver ................ H04N 23/698
2016/0353090 A1    12/2016 Esteban et al.

FOREIGN PATENT DOCUMENTS

| CN | 101938605  | 1/2011 |
|----|------------|--------|
| CN | 107925722  | 4/2018 |
| WO | 2016048014 | 3/2016 |

OTHER PUBLICATIONS

Yang L, Tan Z, Huang Z, Cheung G. A content-aware metric for stitched panoramic image quality assessment. InProceedings of the IEEE International Conference on Computer Vision Workshops 2017 (pp. 2487-2494). (Year: 2017).*

(Continued)

*Primary Examiner* — Clifford Hilaire
(74) *Attorney, Agent, or Firm* — JCIPRNET

(57) ABSTRACT

A method and an electronic apparatus for stitching a three-dimensional spherical panorama are provided. The method includes: obtaining a first image and a second image; projecting the first and seconds image onto a virtual spherical plane to form a first equirectangular panorama and a second equirectangular panorama; duplicating the first equirectangular panorama to generate a third equirectangular panorama, and duplicating the second equirectangular panorama to generate a fourth equirectangular panorama; performing image enhancement on the third and fourth equirectangular panoramas to generate a first enhanced equirectangular panorama and a second enhanced equirectangular panorama; calculating an optical flow for the first and second enhanced equirectangular panoramas; generating the three-dimensional spherical panorama according to the first and second equirectangular panoramas and the optical flow. The method and the electronic apparatus for stitching the three-dimensional spherical panorama may (Continued)

stitch, into the three-dimensional spherical panorama, images output by a radially designed panoramic camera.

16 Claims, 5 Drawing Sheets

(51) Int. Cl.
    *H04N 9/64*     (2023.01)
    *G06T 5/00*     (2006.01)
    *H04N 23/73*     (2023.01)
    *H04N 13/204*     (2018.01)

(52) U.S. Cl.
    CPC ........... *H04N 13/204* (2018.05); *H04N 23/73* (2023.01); *G06T 2207/20021* (2013.01)

(56) References Cited

OTHER PUBLICATIONS

Li, Li, Jian Yao, Renping Xie, Menghan Xia, and Wei Zhang. "A unified framework for street-view panorama stitching." Sensors 17, No. 1 (2016): 1. (Year: 2016).*

Meng M, Liu S. High-quality Panorama Stitching based on Asymmetric Bidirectional Optical Flow. In2020 5th International Conference on Computational Intelligence and Applications (ICCIA) Jun. 19, 2020 (pp. 118-122). IEEE. (Year: 2020).*

Lee H, Lee S, Choi O. Improved method on image stitching based on optical flow algorithm. International Journal of Engineering Business Management. Dec. 23, 2020;12:1847979020980928. (Year: 2020).*

Yacoub, S.N.M., 2018. Quality evaluation for stitched panoramic videos (Doctoral dissertation, Université Grenoble Alpes). (Year: 2018).*

Tan, Zhuo, Shenghao Zhang, and Ronggang Wang. "Stable stitching method for stereoscopic panoramic video." CAAI Transactions on Intelligence Technology 3.1 (2018): 1-7. (Year: 2018).*

Xie C, Zhang X, Yang H, Chen L, Gao Z. Video stitching based on optical flow. In2018 IEEE International Symposium on Broadband Multimedia Systems and Broadcasting (BMSB) Jun. 6, 2018 (pp. 1-5). IEEE. (Year: 2018).*

Robert Anderson, et al., "Jump: Virtual Reality Video", ACM Transactions on Graphics, vol. 35, Issue 6, Article 198, Nov. 2016, pp. 198:1-198:13.

* cited by examiner

METHOD AND ELECTRONIC APPARATUS FOR STITCHING THREE-DIMENSIONAL SPHERICAL PANORAMA

CROSS-REFERENCE TO RELATED APPLICATION

This application claims the priority benefit of China application serial no. 202011129639.1, filed on Oct. 21, 2020. The entirety of the above-mentioned patent application is hereby incorporated by reference herein and made a part of this specification.

BACKGROUND OF THE INVENTION

1. Field of the Invention

The invention relates to an image processing technology, and in particular, to a method and an electronic apparatus for stitching a three-dimensional spherical panorama.

2. Description of Related Art

A spherical panorama stitching technology is a method of combining a plurality of images corresponding to the same area to generate a panorama (an image with a 360-degree horizontal viewing angle and a 180-degree vertical viewing angle). A two-dimensional spherical panorama technology is applied in various fields, such as photography, driver assistance systems, surveillance systems, map street viewing systems, and online house viewing systems. In recent years, due to advancement of graphics processing units (GPU) and promotion of virtual reality and head-mounted displays, three-dimensional spherical panorama technologies have also been developed rapidly.

When a user intends to generate a three-dimensional spherical panorama of a specific area, the user has to simultaneously capture a plurality of images of different viewing angles through a plurality of lenses and then stitch the images into a three-dimensional spherical panorama by applying an image processing technology.

FIG. 1 is a schematic diagram of lens arrangement of a panoramic camera based on a tangential design that is currently adopted in the three-dimensional spherical panorama technology. The panoramic camera based on the tangential design may include a plurality of pairs of lenses. Each pair of lenses may include two lenses disposed on the same plane. For example, the panoramic camera based on the tangential design may include a lens 11 and a lens 12 disposed at one side of a virtual polygon. The lens 11 and the lens 12 may be configured to respectively capture an image corresponding to a left eye and an image corresponding to a right eye. Further, the panoramic camera based on the tangential design may further include a lens 11' and a lens 12' disposed at another side of a virtual polygon. The lens 11' and the lens 12' may be configured to respectively capture an image corresponding to a left eye and an image corresponding to a right eye. During making of the three-dimensional spherical panorama by the panoramic camera based on the tangential design, the panoramic camera based on the tangential design may find out, for example, for the left-eye image through feature matching, feature points of an overlapping area between the image captured by the lens 11 and the image captured by the lens 11', and may find out, for example, for the right-eye image, feature points of an overlapping area between the image captured by the lens 12 and the image captured by the lens 12', and stitch, according to matched feature points, two warped images into the three-dimensional spherical panorama.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a method and an electronic apparatus for stitching a three-dimensional spherical panorama, so that images output by a radially designed panoramic camera may be stitched into the three-dimensional spherical panorama.

Other purposes and advantages of the disclosure can be further understood from the technical features disclosed by the invention.

An embodiment of the invention provides an electronic apparatus for stitching a three-dimensional spherical panorama, including a processor, a storage medium, and a transceiver. The storage medium stores a plurality of modules. The processor is coupled to the storage medium and the transceiver, and is configured to access and execute the modules, where the modules include a data collection module, a correction module, an image pre-processing module, an optical flow calculation module, and an image post-processing module. The data collection module is configured to obtain a first image and a second image through the transceiver. The correction module is configured to project the first image and the second image onto a virtual spherical plane to form a first equirectangular panorama and a second equirectangular panorama, respectively. The image pre-processing module is configured to: duplicate the first equirectangular panorama to generate a third equirectangular panorama, duplicate the second equirectangular panorama to generate a fourth equirectangular panorama, and perform image enhancement on the third equirectangular panorama and the fourth equirectangular panorama to generate a first enhanced equirectangular panorama and a second enhanced equirectangular panorama, respectively. The optical flow calculation module is configured to calculate an optical flow for the first enhanced equirectangular panorama and the second enhanced equirectangular panorama. The image post-processing module is configured to generate the three-dimensional spherical panorama according to the first equirectangular panorama, the second equirectangular panorama, and the optical flow.

An embodiment of the invention provides a method for stitching a three-dimensional spherical panorama, including: obtaining a first image and a second image; projecting the first image and the second image onto a virtual spherical plane to form a first equirectangular panorama and a second equirectangular panorama, respectively; duplicating the first equirectangular panorama to generate a third equirectangular panorama, and duplicating the second equirectangular panorama to generate a fourth equirectangular panorama; performing image enhancement on the third equirectangular panorama and the fourth equirectangular panorama to generate a first enhanced equirectangular panorama and a second enhanced equirectangular panorama, respectively; calculating an optical flow for the first enhanced equirectangular panorama and the second enhanced equirectangular panorama; and generating the three-dimensional spherical panorama according to the first equirectangular panorama, the second equirectangular panorama, and the optical flow.

Based on the above, according to one or more embodiments of the invention, the three-dimensional spherical panorama of the panoramic camera based on the radial design may be stitched, so as to reduce an issue of ghosting or object warping in the stitched images.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
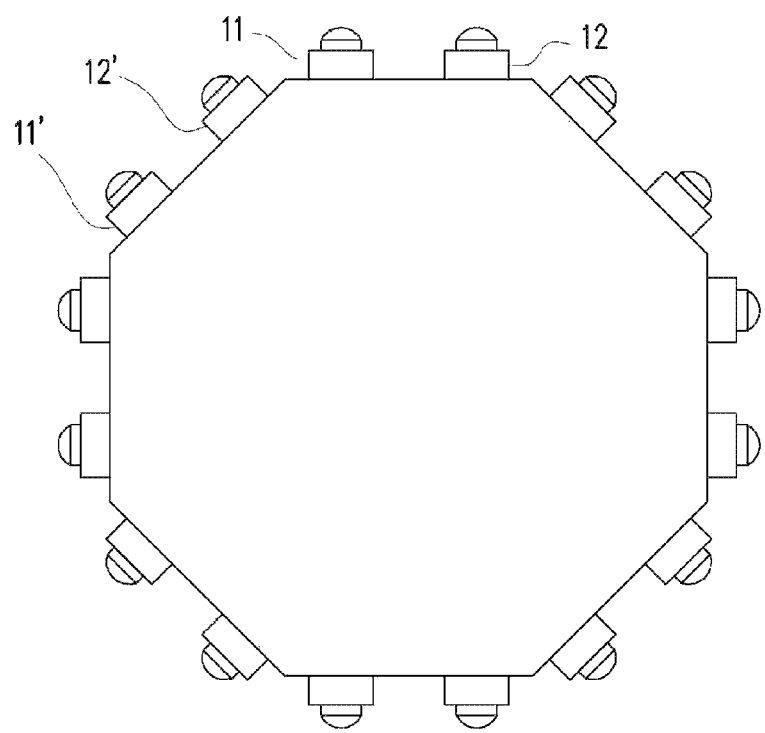
FIG. 1 is a schematic diagram of lens arrangement of a panoramic camera based on a tangential design.
Figure 2:
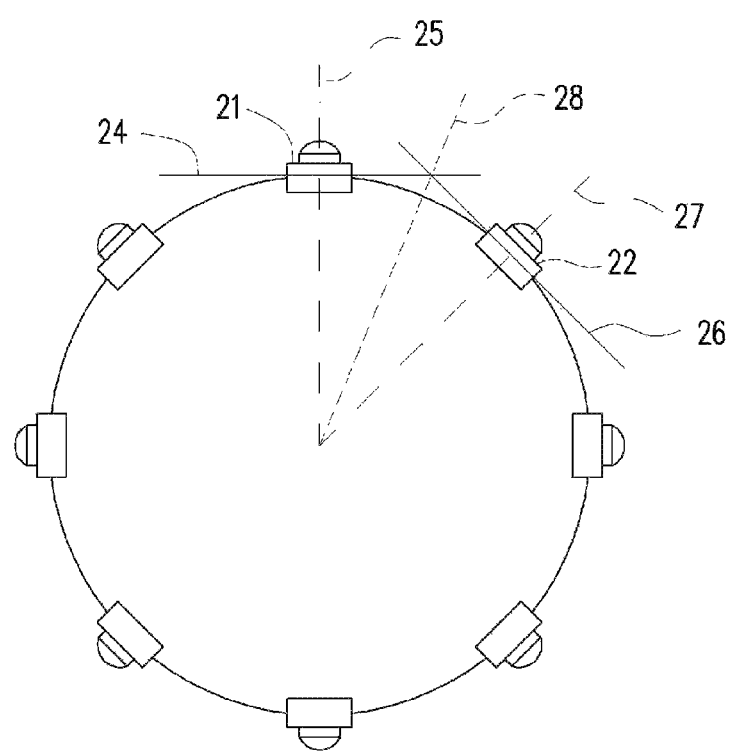
FIG. 2 is a schematic diagram of lens arrangement of a panoramic camera based on a radial design.

FIG. 2 is a schematic diagram of lens arrangement of a panoramic camera based on a radial design. The panoramic camera based on the radial design may include a plurality of lenses. The lenses may be evenly disposed on a virtual circle, and a direction of each lens is orthogonal to a tangent line of the virtual circle. For example, the panoramic camera based on the radial design may include a lens 21 and a lens 22 adjacent to the lens 21. A direction 25 of the lens 21 may be orthogonal to a tangent line 24 of the virtual circle, and a direction 27 of the lens 22 may be orthogonal to a tangent line 26 of the virtual circle. The lens 21 may be configured to capture images in the direction 25, and the lens 22 may be configured to capture images in the direction 27. Compared with a panoramic camera based on a tangential design, the panoramic camera based on the radial design has a shorter dead zone. Therefore, the panoramic camera based on the radial design may be configured to capture images of closer objects.

Each lens of the panoramic camera 20 based on the radial design may be configured to capture images in only a corresponding direction. For example, the lens 21 may be configured to capture images in only the direction 25, and the lens 22 may be configured to capture images in only the direction 27. When it is required that images in a specific direction that cannot be captured by all of the lenses be stitched into a three-dimensional spherical panorama, the panoramic camera 20 needs to obtain an interpolation image (or a virtual image) corresponding to the specific direction by using an interpolation method. For example, when it is required that images in a direction 28 be stitched into the three-dimensional spherical panorama, the panoramic camera 20 needs to obtain optical flows of the images in the direction 25 and optical flows of the images in the direction 27. Then the panoramic camera 20 may perform an interpolation operation on the optical flows of the images in the direction 25 and the optical flows of the images in the direction 27 to generate an interpolation image in the direction 28, and perform stitching for the three-dimensional spherical panorama by using the generated interpolation image. Therefore, in order to more accurately generate the interpolation image, the panoramic camera 20 needs to accurately estimate the optical flow of the image captured by the lens.

Figure 3:
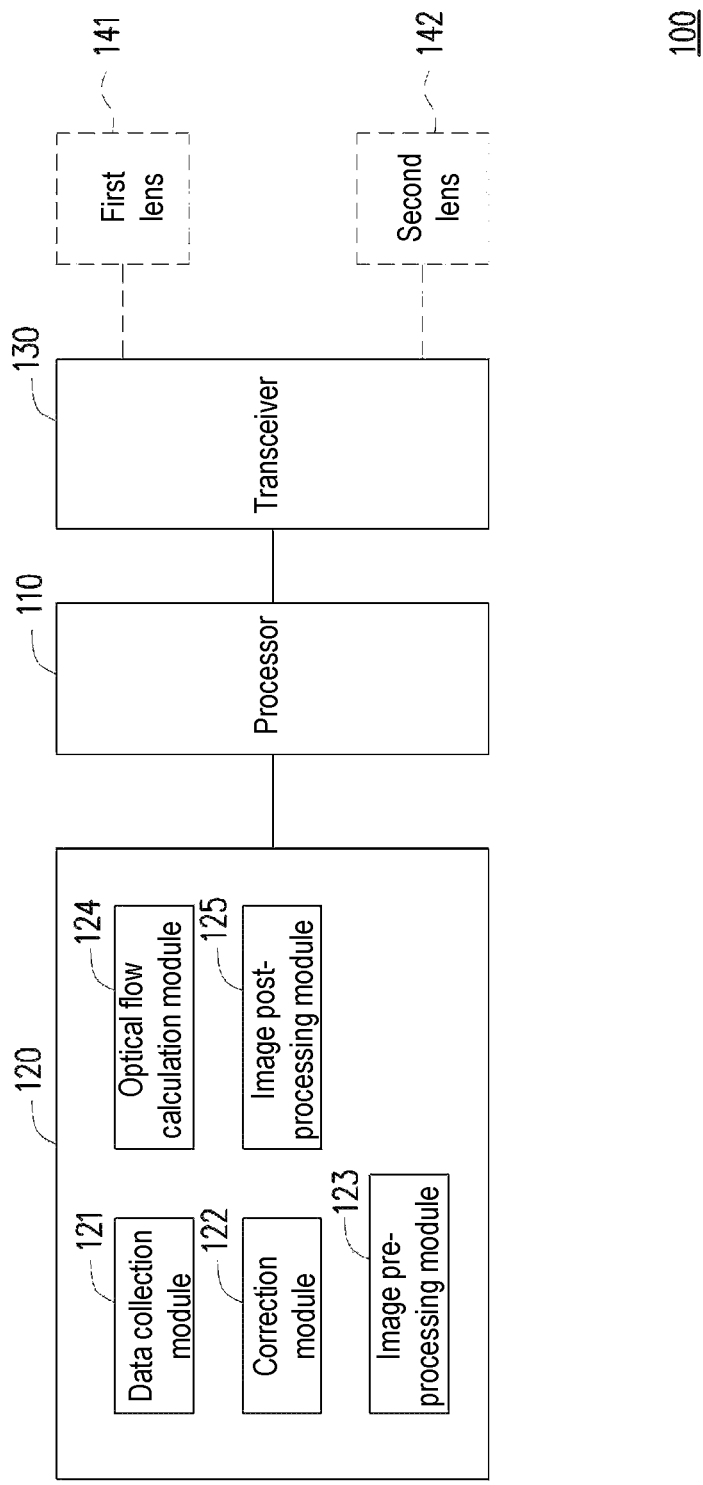
FIG. 3 is a schematic diagram of an electronic apparatus for stitching a three-dimensional spherical panorama according to an embodiment of the invention.

Further, factors such as a parallax change between foreground and background in an image or a failure to meet an assumption of a constant brightness between adjacent images, etc. affect an estimation result of the optical flow, resulting in the issue of ghosting or object warping in the interpolation image. In order to more accurately generate the interpolation image to stitch a three-dimensional spherical panorama, the invention provides an electronic apparatus. FIG. 3 is a schematic diagram of an electronic apparatus 100 for stitching a three-dimensional spherical panorama according to an embodiment of the invention. The electronic apparatus 100 is, for example, a panoramic camera. The electronic apparatus 100 may be configured to process images captured by a panoramic camera based on a radial design to generate a three-dimensional spherical panorama. The electronic apparatus 100 may include a processor 110, a storage medium 120, and a transceiver 130.

The processor 110 is, for example, a central processing unit (CPU), or other programmable micro control units (MCU) for general purposes or special purposes, a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA), or other similar elements or a combination of the above elements. The processor 110 may be coupled to the storage medium 120 and the transceiver 130, and access and execute a plurality of modules and various applications stored in the storage medium 120.

The storage medium 120 is, for example, any type of fixed or removable random access memory (RAM), read-only memory (ROM), flash memory, hard disk drive (HDD), solid state drive (SSD), or similar elements or a combination of the above elements, and is configured to store the modules or the various applications that may be executed by the processor 110. In the embodiment, the storage medium 120 may store a plurality of modules including a data collection module 121, a correction module 122, an image pre-processing module 123, an optical flow calculation module 124, and an image post-processing module 125. Functions of the modules are described later.

The transceiver 130 transmits and receives signals in a wireless or wired manner. The transceiver 130 may further perform operations such as low noise amplification, impedance matching, frequency mixing, up or down frequency conversion, filtering, and amplification, etc.

In an embodiment, the electronic apparatus 100 may be a panoramic camera. The electronic apparatus 100 may further include a first lens 141 and a second lens 142. The first lens 141 may be communicatively connected to the transceiver 130 to transmit an image captured by the first lens 141 to the transceiver 130. The second lens 142 may be communicatively connected to the transceiver 130 to transmit an image captured by the second lens 142 to the transceiver 130. The first lens 141 may be disposed on an arc of a virtual circle, and a first direction of the first lens 141 may be orthogonal to a first tangent line of the virtual circle. The second lens 142 may be disposed on the arc of the virtual circle, and a second direction of the second lens 142 may be orthogonal to a second tangent line of the virtual circle. A positional relationship among the first lens 141, the second lens 142, and the virtual circle may be configured to be similar to the positional relationship among the lens 21, the lens 22, and the virtual circle shown in FIG. 2.

The data collection module 121 may obtain the first image and the second image through the transceiver 130. In an embodiment, the first image and the second image may respectively come from the first lens 141 and the second lens 142.

The correction module 122 may project the first image and the second image onto a virtual spherical plane, to form a first equirectangular panorama (equirectangular panorama) (for example, an equirectangular rectangular cylindrical image) and a second equirectangular panorama (for example, an equirectangular rectangular cylindrical image) respectively. Compared with the first image or the second image, the first equirectangular panorama or the second equirectangular panorama is more in line with visual experience of human eyes when viewing an actual scene.

In an embodiment, the correction module 122 may generate the first equirectangular panorama corresponding to the first image and the second equirectangular panorama corresponding to the second image based on internal parameters or external parameters. Parameters such as lens focal lengths, lens center positions, and relative positions between lenses, etc. of different image capturing apparatuses may be different. In order to eliminate influence of the image capturing apparatus on images, the correction module 122 may obtain, through the transceiver 130, internal parameters and external parameters of an image capturing apparatus configured to capture the first image or the second image, and pre-store the internal parameters and the external parameters in the storage medium 120. Then the correction module 122 may correct the first equirectangular panorama corresponding to the first image and the second equirectangular panorama corresponding to the second image based on the internal parameters and the external parameters. The internal parameters may include a lens focal length and a lens center position, etc. obtained after a camera correction procedure, and the external parameters may include relative positions between lenses, but the invention is not limited thereto.

The image pre-processing module 123 may perform exposure correction and color correction on the first equirectangular panorama and the second equirectangular panorama, to eliminate brightness and color differences between adjacent pixels of the first equirectangular panorama or the second equirectangular panorama. After completing the exposure correction and the color correction, the image pre-processing module 123 may duplicate the first equirectangular panorama to generate a third equirectangular panorama, and may duplicate the second equirectangular panorama to generate a fourth equirectangular panorama.

The image pre-processing module 123 may further perform image enhancement on the third equirectangular panorama and the fourth equirectangular panorama to generate a first enhanced equirectangular panorama and a second enhanced equirectangular panorama, respectively. The image enhancement may enhance a difference between feature points in the equirectangular panorama, thereby highlighting the feature points.

The optical flow calculation module 124 may calculate an optical flow for the first enhanced equirectangular panorama and the second enhanced equirectangular panorama. The optical flow calculation module 124 may calculate the optical flows corresponding to the first enhanced equirectangular panorama and the second enhanced equirectangular panorama by using, for example, a deep learning algorithm, but the invention is not limited thereto.

After obtaining the optical flows, the image post-processing module 125 may smoothen the optical flows. In detail, the image post-processing module 125 may segment the first enhanced equirectangular panorama and the second enhanced equirectangular panorama on a two-dimensional plane to generate a plurality of segmented projection images. The image post-processing module 125 may generate a plurality of linear conversion parameters for the segmented projection images by using a random sample consensus (RANSAC) method. The linear conversion parameters respectively correspond to the segmented projection images. Then the image post-processing module 125 may smoothen the optical flow according to the linear conversion parameters. The image post-processing module 125 may segment the optical flow into a plurality of segmented optical flows, that is, the optical flow includes a plurality of segmented optical flows. The segmented optical flows may respectively correspond to the segmented projection images (or the linear conversion parameters). The image post-processing module 125 may multiply each of the segmented optical flows by a corresponding linear conversion parameter to obtain a smoothened segmented optical flow. After obtaining a plurality of smoothened segmented optical flows respectively corresponding to the segmented optical flows, the image post-processing module 125 may combine the smoothened segmented optical flows into a smoothened optical flow.

After smoothening the optical flow, the image post-processing module 125 may generate the three-dimensional spherical panorama according to the first equirectangular panorama, the second equirectangular panorama, and the optical flow. The image post-processing module 125 may refine the optical flow. In detail, the image post-processing module 125 may perform alpha blending on the optical flow to generate a refined optical flow. Further, the image post-processing module 125 may perform alpha blending on an optical flow that is not smoothened and the smoothened optical flow to generate a refined optical flow.

The image post-processing module 125 may generate an interpolation image according to the first equirectangular panorama, the second equirectangular panorama, and the refined optical flow, and generate the three-dimensional spherical panorama according to the interpolation image. In detail, after the interpolation image is generated, the image post-processing module 125 may stitch the first equirectangular panorama (for example, the first equirectangular panorama after the exposure correction and the color correction), the second equirectangular panorama (for example, the second equirectangular panorama after the exposure correction and the color correction), and the interpolation images to generate a three-dimensional spherical panorama.

Figure 4:
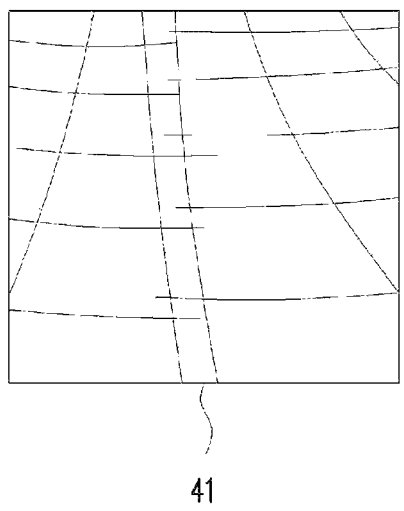
FIG. 4 is a schematic diagram of three-dimensional spherical panorama comparison according to an embodiment of the invention.
Figure 4:
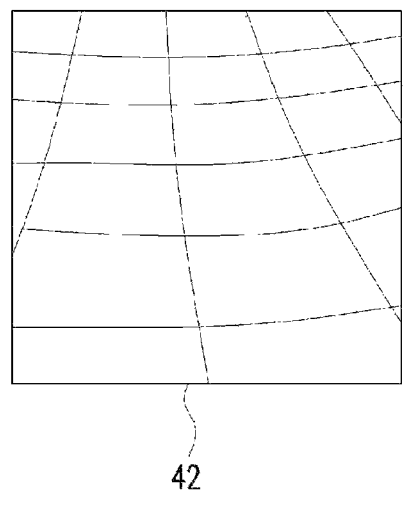

FIG. 4 is a schematic diagram of three-dimensional spherical panorama comparison according to an embodiment of the invention. An image 41 and an image 42 are three-dimensional spherical panoramas of a same tiled floor. The image 41 is a three-dimensional spherical panorama generated according to a traditional stitching technology, and the image 42 is a three-dimensional spherical panorama generated according to the embodiments of the invention. Compared to the image 41, the image 42 is less likely to encounter the issue of ghosting and object warping.

Figure 5:
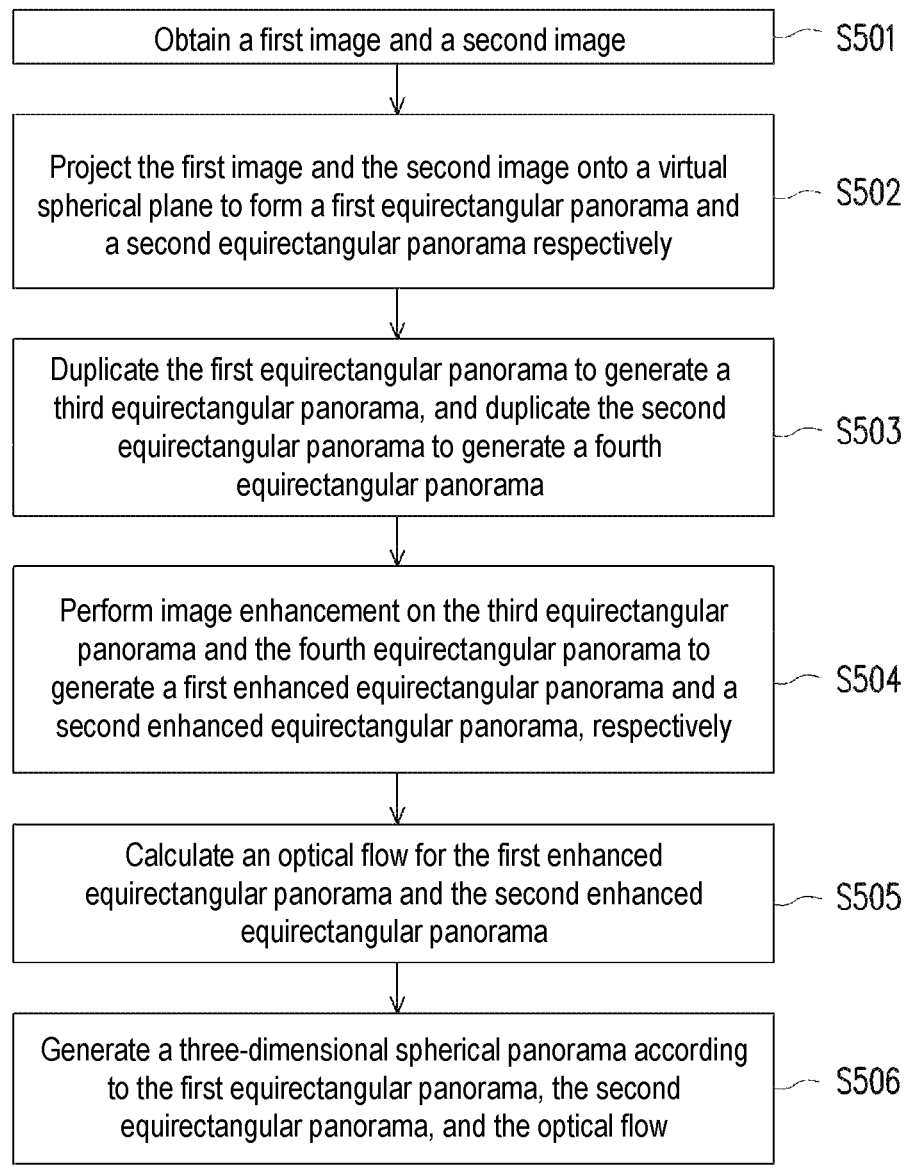
FIG. 5 is a flowchart of a method for stitching a three-dimensional spherical panorama according to an embodiment of the invention.

FIG. 5 is a flowchart of a method for stitching a three-dimensional spherical panorama according to an embodiment of the invention. The method may be implemented by the electronic apparatus 100 shown in FIG. 3. In step S501, a first image and a second image are obtained. In step S502, the first image and the second image are projected onto a virtual spherical plane to form a first equirectangular panorama and a second equirectangular panorama, respectively. In step S503, the first equirectangular panorama is duplicated to generate a third equirectangular panorama, and the second equirectangular panorama is duplicated to generate a fourth equirectangular panorama. In step S504, image enhancement is performed on the third equirectangular panorama and the fourth equirectangular panorama to generate a first enhanced equirectangular panorama and a second enhanced equirectangular panorama, respectively. In step S505, an optical flow is calculated for the first enhanced equirectangular panorama and the second enhanced equirectangular panorama. In step S506, the three-dimensional spherical panorama is generated according to the first equirectangular panorama, the second equirectangular panorama, and the optical flow.

Based on the above, the invention may be used to stitch a three-dimensional spherical panorama of a panoramic camera based on a radial design. According to the invention, internal parameters and external parameters may be pre-corrected before capturing of images, to more accurately project the images onto the spherical plane to generate an equirectangular rectangular cylindrical image, and the captured image may maintain constant color and brightness through image pre-processing. The optical flow calculated based on the corrected image is more accurate. The invention may be used perform exposure correction and color correction on the equirectangular rectangular cylindrical image used for generating the three-dimensional spherical panorama, so as to eliminate brightness and color differences between adjacent pixels. According to the invention, features of the equirectangular rectangular cylindrical image may be further highlighted through image enhancement. The optical flow calculated based on the enhanced image is more accurate. According to the invention, the optical flow may be smoothened and refined to reduce the issue of ghosting or object warping in the interpolation image generated according to the optical flow.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An electronic apparatus for stitching a three-dimensional spherical panorama, wherein the electronic apparatus comprises a transceiver, a storage medium, and a processor, wherein the storage medium stores a plurality of modules, and the processor is coupled to the storage medium and the transceiver and is configured to access and execute the plurality of modules, the plurality of modules comprising a data collection module, a correction module, an image pre-processing module, an optical flow calculation module, and an image post-processing module, wherein the data collection module is configured to obtain a first image and a second image through the transceiver;

the correction module is configured to project the first image and the second image onto a virtual spherical plane to form a first equirectangular panorama and a second equirectangular panorama, respectively;

the image pre-processing module is configured to duplicate the first equirectangular panorama to generate a third equirectangular panorama, duplicate the second equirectangular panorama to generate a fourth equirectangular panorama, and perform image enhancement on the third equirectangular panorama and the fourth equirectangular panorama to generate a first enhanced equirectangular panorama and a second enhanced equirectangular panorama, respectively;

the optical flow calculation module is configured to calculate an optical flow for the first enhanced equirectangular panorama and the second enhanced equirectangular panorama; and the image post-processing module is configured to generate the three-dimensional spherical panorama according to the first equirectangular panorama, the second equirectangular panorama, and the optical flow.

2. The electronic apparatus according to claim 1, wherein the image post-processing module is further configured to: segment the first enhanced equirectangular panorama and the second enhanced equirectangular panorama on a two-dimensional plane to generate a plurality of segmented projection images, generate a plurality of linear conversion parameters for the plurality of segmented projection images by using a random sample consensus method, and smoothen the optical flow according to the plurality of linear conversion parameters, wherein the optical flow comprises a plurality of segmented optical flows, and the plurality of segmented optical flows respectively correspond to the plurality of segmented projection images.

3. The electronic apparatus according to claim 1, wherein the image post-processing module is configured to perform alpha blending on the optical flow to generate a refined optical flow and generate the three-dimensional spherical panorama according to the first equirectangular panorama, the second equirectangular panorama, and the refined optical flow.

4. The electronic apparatus according to claim 1, wherein the correction module is configured to generate the first equirectangular panorama corresponding to the first image and the second equirectangular panorama corresponding to the second image based on internal parameters and external parameters, wherein the internal parameters and the external parameters are pre-stored in the storage medium.

5. The electronic apparatus according to claim 1, wherein the image pre-processing module is further configured to perform exposure correction and color correction on the first equirectangular panorama and the second equirectangular panorama.

6. The electronic apparatus according to claim 1, wherein the optical flow calculation module is configured to calculate the optical flow according to a deep learning algorithm.

7. The electronic apparatus according to claim 1, wherein the image post-processing module is configured to generate an interpolation image according to the first equirectangular panorama, the second equirectangular panorama, and the optical flow and generate the three-dimensional spherical panorama according to the interpolation image.

8. The electronic apparatus according to claim 1, further comprising:
a first lens communicatively connected to the transceiver and configured to obtain the first image, wherein a first direction of the first lens is orthogonal to a first tangent line of a virtual circle; and
a second lens communicatively connected to the transceiver and configured to obtain the second image, wherein a second direction of the second lens is orthogonal to a second tangent line of the virtual circle.

9. A method for stitching a three-dimensional spherical panorama, wherein the method comprises:
obtaining a first image and a second image;
projecting the first image and the second image onto a virtual spherical plane to form a first equirectangular panorama and a second equirectangular panorama, respectively;
duplicating the first equirectangular panorama to generate a third equirectangular panorama, and duplicating the second equirectangular panorama to generate a fourth equirectangular panorama;
performing image enhancement on the third equirectangular panorama and the fourth equirectangular panorama to generate a first enhanced equirectangular panorama and a second enhanced equirectangular panorama, respectively;
calculating an optical flow for the first enhanced equirectangular panorama and the second enhanced equirectangular panorama; and
generating the three-dimensional spherical panorama according to the first equirectangular panorama, the second equirectangular panorama, and the optical flow.

10. The method according to claim 9, wherein the step of generating the three-dimensional spherical panorama comprises:
segmenting the first enhanced equirectangular panorama and the second enhanced equirectangular panorama on a two-dimensional plane to generate a plurality of segmented projection images;
generating a plurality of linear conversion parameters for the plurality of segmented projection images by using a random sample consensus method; and
smoothening the optical flow according to the plurality of linear conversion parameters, wherein the optical flow comprises a plurality of segmented optical flows, and the plurality of segmented optical flows respectively correspond to the plurality of segmented projection images.

11. The method according to claim 9, wherein the step of generating the three-dimensional spherical panorama further comprises:
performing alpha blending on the optical flow to generate a refined optical flow; and
generating the three-dimensional spherical panorama according to the first equirectangular panorama, the second equirectangular panorama, and the refined optical flow.

12. The method according to claim 9, further comprising:
generating the first equirectangular panorama corresponding to the first image and the second equirectangular panorama corresponding to the second image based on internal parameters and external parameters.

13. The method according to claim 9, further comprising:
performing exposure correction and color correction on the first equirectangular panorama and the second equirectangular panorama.

14. The method according to claim 9, wherein the step of calculating the optical flow comprises:
calculating the optical flow according to a deep learning algorithm.

15. The method according to claim 9, wherein the step of generating the three-dimensional spherical panorama further comprises:
generating an interpolation image according to the first equirectangular panorama, the second equirectangular panorama, and the optical flow; and
generating the three-dimensional spherical panorama according to the interpolation image.

16. The method according to claim 9, wherein the method is adapted for a panoramic camera having a first lens and a second lens, wherein the first lens is configured to obtain the first image, and the second lens is configured to obtain the second image, wherein a first direction of the first lens is orthogonal to a first tangent line of a virtual circle, and a second direction of the second lens is orthogonal to a second tangent line of the virtual circle.

\* \* \* \* \*